(12) United States Patent
Johnson et al.

(10) Patent No.: US 7,780,339 B2
(45) Date of Patent: *Aug. 24, 2010

(54) VORTEX MOTION PAINT MIXING MACHINE

(75) Inventors: Benjamin M. Johnson, Coon Rapids, MN (US); Aaron Curtis, Eagan, MN (US)

(73) Assignee: Red Devil Equipment Company, Plymouth, MN (US)

( * ) Notice: Subject to any disclaimer, the term of this patent is extended or adjusted under 35 U.S.C. 154(b) by 733 days.

This patent is subject to a terminal disclaimer.

(21) Appl. No.: 11/409,801

(22) Filed: Apr. 24, 2006

(65) Prior Publication Data

US 2007/0247967 A1    Oct. 25, 2007

(51) Int. Cl.
    *B01F 11/00*     (2006.01)
(52) U.S. Cl. ...................................... 366/217
(58) Field of Classification Search ................ 267/153; 366/217
See application file for complete search history.

(56) References Cited

U.S. PATENT DOCUMENTS

| | | | | |
|---|---|---|---|---|
| 1,519,475 | A | * | 12/1924 | Altorfer ....................... 68/171 |
| 2,113,382 | A | * | 4/1938 | Oppenheimer .............. 267/253 |
| 2,117,226 | A | * | 5/1938 | Stewart ....................... 366/217 |
| 2,181,079 | A | * | 11/1939 | Dehuff ........................ 366/207 |
| 2,230,325 | A | * | 2/1941 | Haver .......................... 366/111 |
| 2,298,585 | A | * | 10/1942 | Phelps ......................... 267/254 |
| 2,334,315 | A | * | 11/1943 | Chott .......................... 366/217 |
| 2,344,896 | A | * | 3/1944 | Phelps ......................... 267/222 |
| 2,502,744 | A | * | 4/1950 | Parker ..................... 280/86.757 |
| 2,575,858 | A | * | 11/1951 | Bennett ....................... 248/606 |
| 2,636,719 | A | | 4/1953 | O'Connor |
| 2,658,247 | A | * | 11/1953 | Heuer .......................... 248/73 |
| 2,846,201 | A | * | 8/1958 | Mermelstein ............... 366/110 |

(Continued)

FOREIGN PATENT DOCUMENTS

JP      1043567      2/1998

(Continued)

OTHER PUBLICATIONS

Lake, Roderic. Viscoelastic Solids, pp. 397-398; CRC Press 1998.*

(Continued)

*Primary Examiner*—David L Sorkin
*Assistant Examiner*—Andrew Janca
(74) *Attorney, Agent, or Firm*—Faegre & Benson LLP

(57) ABSTRACT

A vortex motion paint mixing machine having a paint container holder spinning and orbiting in a paint mixing assembly pivotally connected to a base, one or more viscoelastic polymer dampers and a control arm.

A method of damping vibration in a paint mixing machine by: a) providing a receptacle for receiving one of a cylindrical or a non-cylindrical paint container on a mixing assembly; b) pivotally mounting the mixing assembly on a base; c) providing one or more viscoelastic vibration dampers between the mixing assembly and the base; d) connecting the mixing assembly and the base with a control arm; e) rotating a paint container in the receptacle in a spinning motion about an axis of the receptacle and in an orbiting motion about an axis separate from the axis of the receptacle; and f) damping vibration between the mixing assembly and the base using the viscoelastic vibration damper.

13 Claims, 16 Drawing Sheets

U.S. PATENT DOCUMENTS

| | | | | |
|---|---|---|---|---|
| 2,904,330 A * | 9/1959 | Jackson et al. | | 267/64.19 |
| 2,913,251 A * | 11/1959 | Herbenar | | 280/124.136 |
| 3,033,587 A * | 5/1962 | Perish | | 280/124.106 |
| 3,092,397 A * | 6/1963 | Dullabaun et al. | | 280/6.158 |
| 3,118,687 A * | 1/1964 | Forbush | | 280/124.136 |
| 3,199,775 A * | 8/1965 | Drucker | | 494/19 |
| 3,215,384 A * | 11/1965 | Chambers | | 403/98 |
| 3,231,040 A * | 1/1966 | Blanchette | | 280/86.75 |
| 3,330,515 A * | 7/1967 | Janssen et al. | | 248/606 |
| 3,438,604 A * | 4/1969 | Spicer | | 248/74.5 |
| 3,552,785 A * | 1/1971 | Elder et al. | | 403/197 |
| 3,584,894 A * | 6/1971 | Jackson | | 280/6.159 |
| 3,592,484 A * | 7/1971 | Burke | | 280/6.159 |
| 3,679,184 A | 7/1972 | Woodham et al. | | |
| 3,778,033 A | 12/1973 | Pullman | | |
| 3,795,392 A * | 3/1974 | Nemec | | 267/140 |
| 3,809,322 A * | 5/1974 | Hirosawa | | 241/46.17 |
| 3,869,074 A * | 3/1975 | Roach | | 224/149 |
| 3,877,178 A | 4/1975 | Campanelli | | |
| 3,879,051 A * | 4/1975 | Kolbe | | 280/86.751 |
| 4,042,260 A * | 8/1977 | Youmans | | 280/124.113 |
| 4,066,058 A * | 1/1978 | Anderkay | | 123/198 E |
| 4,097,057 A * | 6/1978 | Goodrich et al. | | 280/124.151 |
| 4,125,335 A | 11/1978 | Blume et al. | | |
| 4,235,553 A | 11/1980 | Gall | | |
| 4,316,672 A * | 2/1982 | Kerscher | | 366/212 |
| 4,422,768 A | 12/1983 | Solomon | | |
| 4,445,782 A * | 5/1984 | Sparrow, Jr. | | 366/217 |
| 4,497,581 A | 2/1985 | Miller | | |
| 4,509,781 A * | 4/1985 | Dick et al. | | 293/104 |
| 4,571,963 A * | 2/1986 | Williams | | 68/171 |
| 4,619,532 A | 10/1986 | Schmidt, III | | |
| 4,637,628 A * | 1/1987 | Perkins | | 280/124.106 |
| 4,648,579 A * | 3/1987 | Wilson | | 248/638 |
| 4,679,761 A * | 7/1987 | Small | | 248/609 |
| 4,693,457 A * | 9/1987 | Kamata | | 267/153 |
| 4,693,492 A * | 9/1987 | Schindler et al. | | 280/124.129 |
| 4,728,197 A | 3/1988 | Reinhard | | |
| 4,828,394 A | 5/1989 | Andrews | | |
| 4,834,548 A | 5/1989 | Tempel et al. | | |
| 5,261,744 A * | 11/1993 | Brunn | | 366/217 |
| 5,352,037 A | 10/1994 | Jouvin | | |
| 5,362,920 A * | 11/1994 | Richardson, Jr. | | 174/42 |
| 5,478,148 A * | 12/1995 | Thomas et al. | | 366/241 |
| 5,537,810 A * | 7/1996 | Paweletz | | 57/406 |
| 5,551,779 A | 9/1996 | Gantner et al. | | |
| 5,567,050 A * | 10/1996 | Zlobinsky et al. | | 366/209 |
| 5,746,510 A | 5/1998 | Mark et al. | | |
| 5,758,896 A * | 6/1998 | Cruise | | 280/124.167 |
| 5,816,566 A * | 10/1998 | Gau et al. | | 267/140.13 |
| 5,884,893 A * | 3/1999 | Seki et al. | | 248/638 |
| 5,921,676 A * | 7/1999 | Reynolds et al. | | 366/208 |
| 6,021,993 A * | 2/2000 | Kirkwood | | 248/634 |
| 6,099,160 A * | 8/2000 | Flackett | | 366/217 |
| 6,328,274 B1 * | 12/2001 | Hayashi | | 248/638 |
| 6,557,816 B2 * | 5/2003 | Yoshida | | 248/674 |
| 6,579,002 B1 | 6/2003 | Bartick et al. | | |
| 6,722,669 B1 * | 4/2004 | Stammreich | | 280/5.514 |
| 6,767,125 B2 | 7/2004 | Midas et al. | | |
| 6,767,126 B2 | 7/2004 | Miller | | |
| 6,817,751 B2 | 11/2004 | Huckby et al. | | |
| 6,953,279 B2 | 10/2005 | Midas et al. | | |
| 7,101,077 B2 * | 9/2006 | Esteve et al. | | 366/110 |
| 7,182,506 B2 * | 2/2007 | Schulz et al. | | 366/217 |
| 7,344,300 B2 * | 3/2008 | Midas et al. | | 366/209 |
| 7,448,789 B2 * | 11/2008 | Boquet et al. | | 366/110 |
| 7,487,958 B2 * | 2/2009 | Wang | | 267/136 |
| 7,507,015 B2 * | 3/2009 | Wang | | 366/217 |
| 2003/0142583 A1 | 7/2003 | Santospago et al. | | |
| 2003/0214878 A1 | 11/2003 | Huckby | | |
| 2004/0141412 A1 * | 7/2004 | Midas et al. | | 366/217 |
| 2005/0152216 A1 * | 7/2005 | Friedman | | 366/208 |
| 2006/0002228 A1 * | 1/2006 | Schulz et al. | | 366/209 |
| 2006/0002229 A1 * | 1/2006 | Schulz et al. | | 366/217 |
| 2006/0027954 A1 * | 2/2006 | Nesbitt et al. | | 267/64.11 |
| 2007/0070804 A1 * | 3/2007 | Wang | | 366/217 |
| 2008/0151685 A1 * | 6/2008 | Wang | | 366/217 |
| 2008/0159066 A1 * | 7/2008 | Wang | | 366/217 |

FOREIGN PATENT DOCUMENTS

| | | |
|---|---|---|
| JP | 1043568 | 2/1998 |
| JP | 11226375 | 8/1999 |
| JP | 200084388 | 3/2000 |
| JP | 2000176268 | 6/2000 |
| JP | 2000271465 | 10/2000 |
| JP | 2001246326 | 9/2001 |

OTHER PUBLICATIONS

Viscoelasticity. Wikipedia, downloaded Jul. 29, 2009.*
"Technical Section: Vibration and Shock," Tech Products Corporation, A Fabreeka Company, http://www.tpcdayton.com/vibration/techdata/technica.htm, 7 pp.
"Selecting the Right Vibro-Insulator®," Vibro-Insulators® website, http://www.karman.com/selectvibro.cfm, 3 pp.
"A Guide to Vibration Isolation," Warden Fluid Dynamics website, http://wfdonline.com/tech_vibrate.htm, 3 pp.
Figures relating to vibration and shock, Tech Products Corporation, A Fabreeka Corporation, http://tpcdayton.com/vibration/techdata/technica.htm, 5 pp.

* cited by examiner

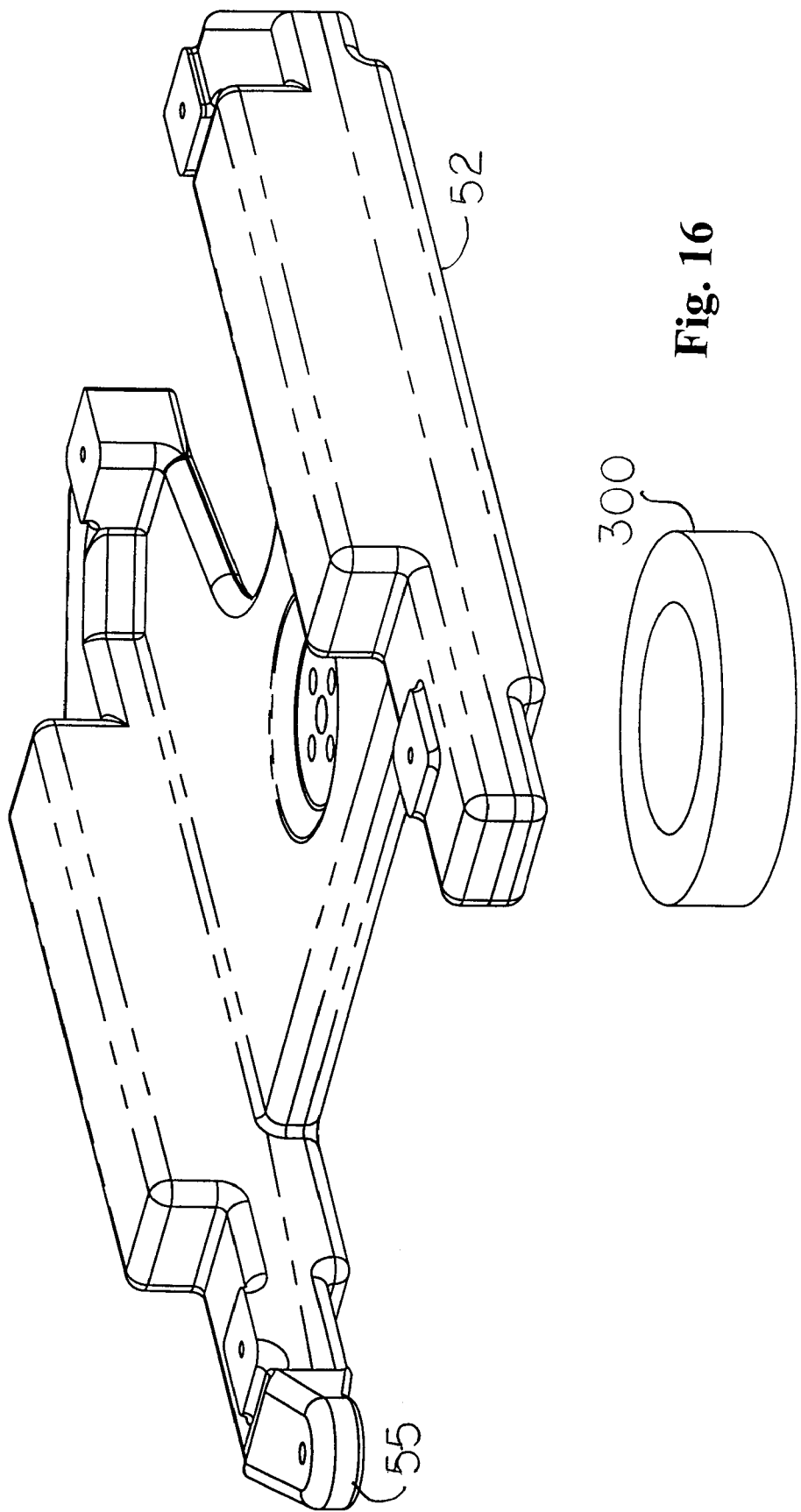

VORTEX MOTION PAINT MIXING MACHINE

The present invention relates to the field of paint mixing, particularly machines for mixing paint in retail-sized one gallon containers, most particularly to those machines which spin and revolve the paint container on more than one axis.

BACKGROUND OF THE INVENTION

In the past, paint has been uniformly sold in the United States at the retail level in one gallon cylindrical cans or containers. Certain prior art paint mixers were designed for mixing custom colors of paint in these one gallon cylindrical containers, using both revolving ( or orbital) and spinning motion with the cylindrical container held at an angle during paint mixing operation. Recently paint has become available in a square or rectangular shaped polymer container which has a handle molded integrally into one corner of the container for the painter's convenience in pouring paint from the container. This new design of paint container results in a significant imbalance (because, in part, of the void created with the molded handle) when the paint container is subject to the orbital and spinning motion desirable for paint mixing.

When prior paint art mixers were attempted to be used with a rectangular shaped paint container, unacceptable vibration resulted. Imbalance in prior art paint mixers manifests itself in vibration of the mixer, sometimes resulting in the mixer "walking" or moving laterally across the surface upon which it was supported. Such walking is undesirable, particularly when the mixer is located on a surface elevated above a floor, as for example, when the mixer is "stacked" on top of other equipment, placed on a countertop, or placed in stand.

SUMMARY OF THE INVENTION

The present invention provides an improved performance for vortex mixers by decoupling the vibrations caused by imbalance from the frame of the mixer and stops the mixer from "walking." The present invention is useful to mix paint in containers having a base or bottom and corresponding sidewalls that are configured to be square, rectangular or non-cylindrical shaped while still retaining the ability to mix paint that is in traditional cylindrical metal or plastic paint cans or containers. This invention overcomes the unacceptable vibration observed during the orbital and spinning motion desirably used to mix paint in a vortex mixer when square, rectangular or other non-cylindrical shaped containers are used in conventional mixers.

One embodiment of the invention is a vortex motion paint mixing machine having a paint container holder spinning about its own axis and orbiting about a second axis positioned at an angle to the container spin axis that has a paint mixing assembly pivotally connected to a base, one or more viscoelastic polymer dampers between the paint mixing assembly and the base, and a control arm connecting the paint mixing assembly to the base.

Another embodiment of the invention is a method of damping vibration in a paint mixing machine for mixing paint in cylindrical or non-cylindrical containers. This method includes the steps of: a) providing a receptacle for receiving one of a cylindrical or a non-cylindrical paint container on a mixing assembly; b) pivotally mounting the mixing assembly on a base; c) providing one or more viscoelastic vibration dampers between the mixing assembly and the base; d) connecting the mixing assembly and the base with a control arm; e) rotating a paint container in the receptacle in a spinning motion about an axis of the receptacle and in an orbiting motion about an axis separate from the axis of the receptacle; and f) damping vibration between the mixing assembly and the base such that vibration in the base caused by the rotating paint container is reduced by the viscoelastic vibration damper.

BRIEF DESCRIPTION OF THE DRAWINGS

FIG. 16 is an exploded view of a subassembly of the mixing assembly of FIG. 5 illustrating a vibration damper.

DETAILED DESCRIPTION

Vortex Mixer

Referring to the figures, and particularly to FIGS. 1 to 5, a paint mixing machine or vortex mixer 20 according to the present invention is illustrated. It is to be understood that an enclosure is customarily provided to surround and fully enclose the vortex mixer 20. Although the enclosure is not illustrated in the figures, a common enclosure has an access door to allow a user to insert and remove a paint container for mixing, and the enclosure also includes a door interlock switch and a timer.

Overall, vortex mixer 20 has a base supported by a plurality of feet and a control arm attached or connected to both the base and mixing assembly. The mixing frame is connected to the base by a pivotal mount and is supported on the base by a vibration damper.

Figure 4:
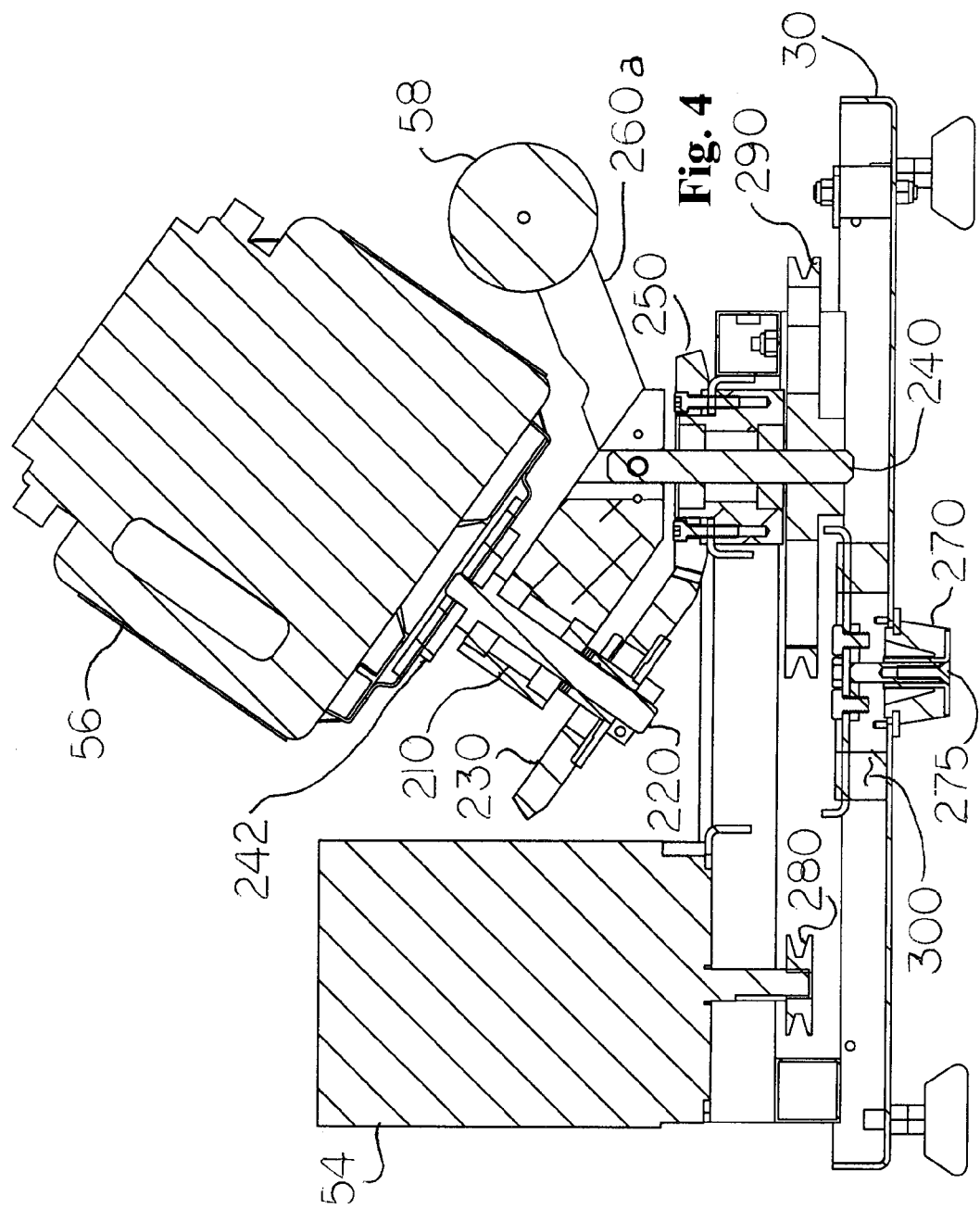
FIG. 4 is a side cross sectional view of the vortex mixer of FIG. 2.
Figure 5:
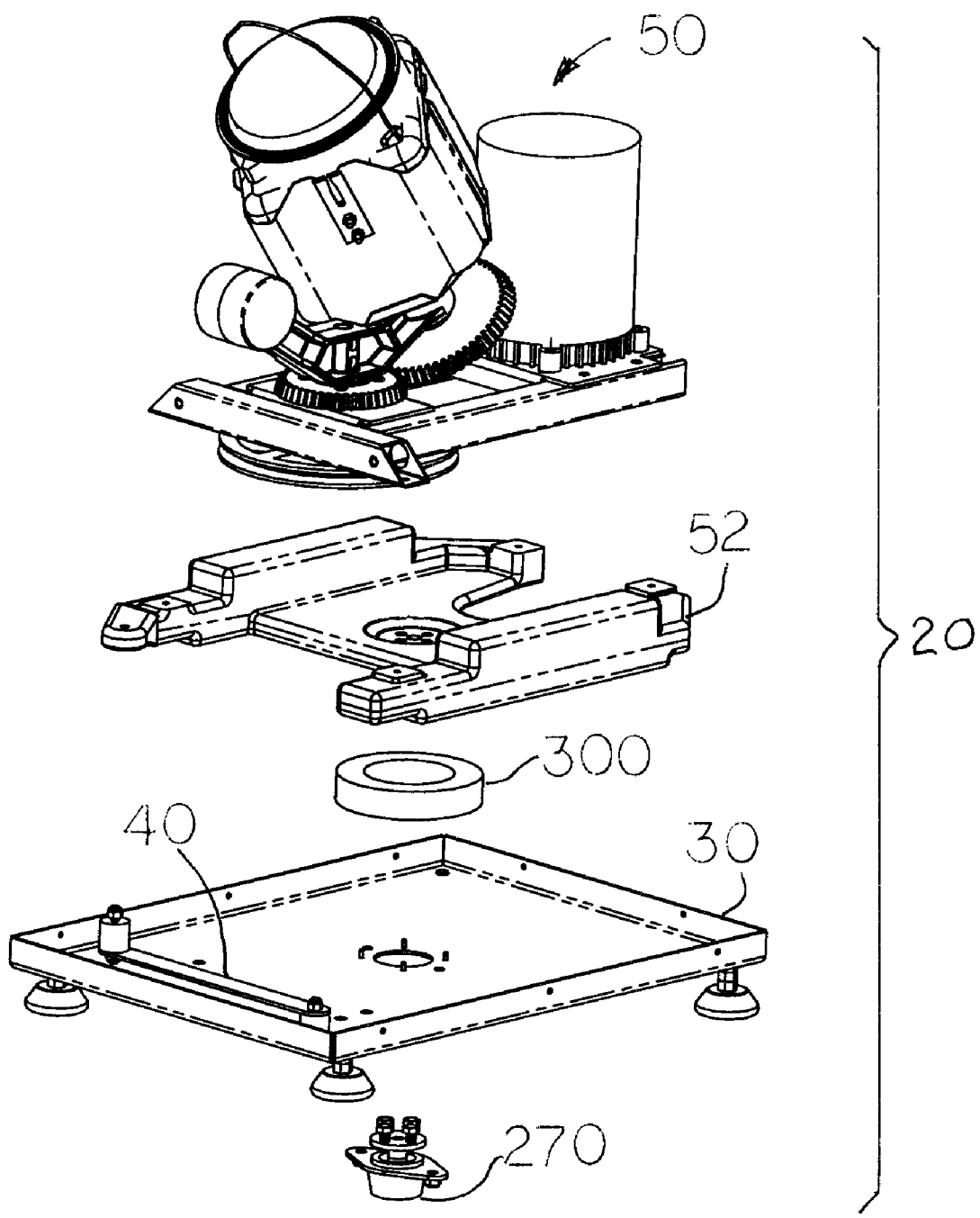
FIG. 5 is an exploded view of the vortex mixer of FIG. 1.

The illustrated components of vortex mixer 20 include a base 30, a control arm 40, a mixing assembly 50 pivotally mounted on the base, and a vibration damper 300 between the mixing assembly and the base (particularly illustrated in FIGS. 4 and 5). The mixing assembly further includes a subframe 52, a motor 54 and drive mechanism subassembly, described in detail below, a paint container holder subassembly 56 and a counterweight 58.

Vortex mixer 20 rotates a paint container 22 about a first axis that is a central axis of the paint container holder, and revolves or orbits paint container 22 about a second axis. These two rotational axes are schematically illustrated in FIG. 12. The paint container may be a conventional one gallon cylindrical paint can (illustrated in FIGS. 9-11) or it may be a rectangular or square shaped paint container 22, illustrated separately in FIG. 13. Vortex mixer 20 has a paint container holder subassembly 56 (particularly illustrated in an exploded view in FIG. 14). Paint container holder 56 is arranged to be able to hold either a conventional cylindrical one gallon paint container or a square or rectangular shaped paint container 22. It is to be understood that other forms of the holder may be used to accommodate other shapes or forms of paint containers, while still retaining the ability to mix cylindrical paint containers. Further, the holder may also be used with an adaptor that will hold other sizes of paint containers such as pint, quart or liter paint containers.

Figure 1:
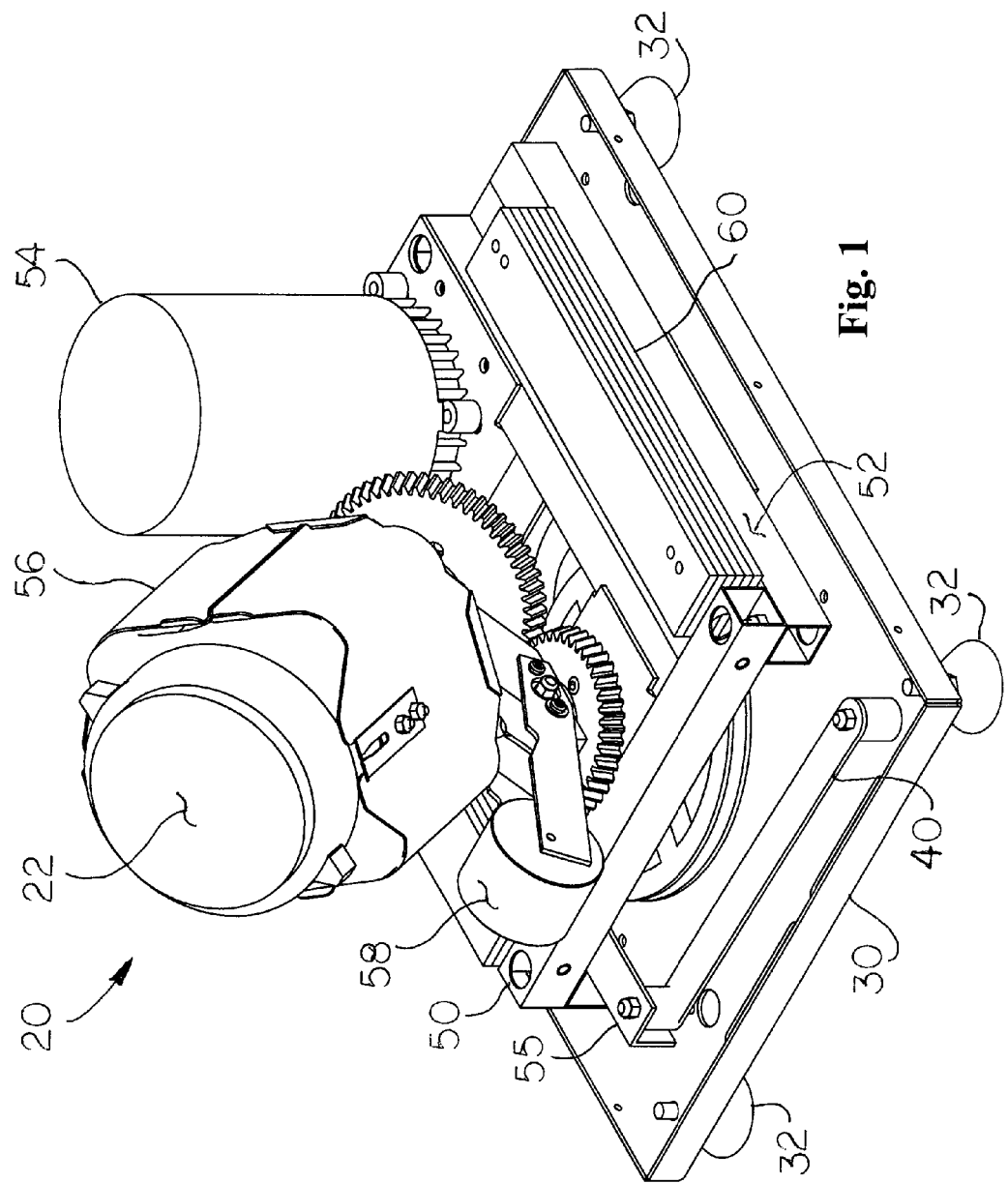
FIG. 1 is a perspective view of an embodiment of a vortex mixer of the present invention.
Figure 2:
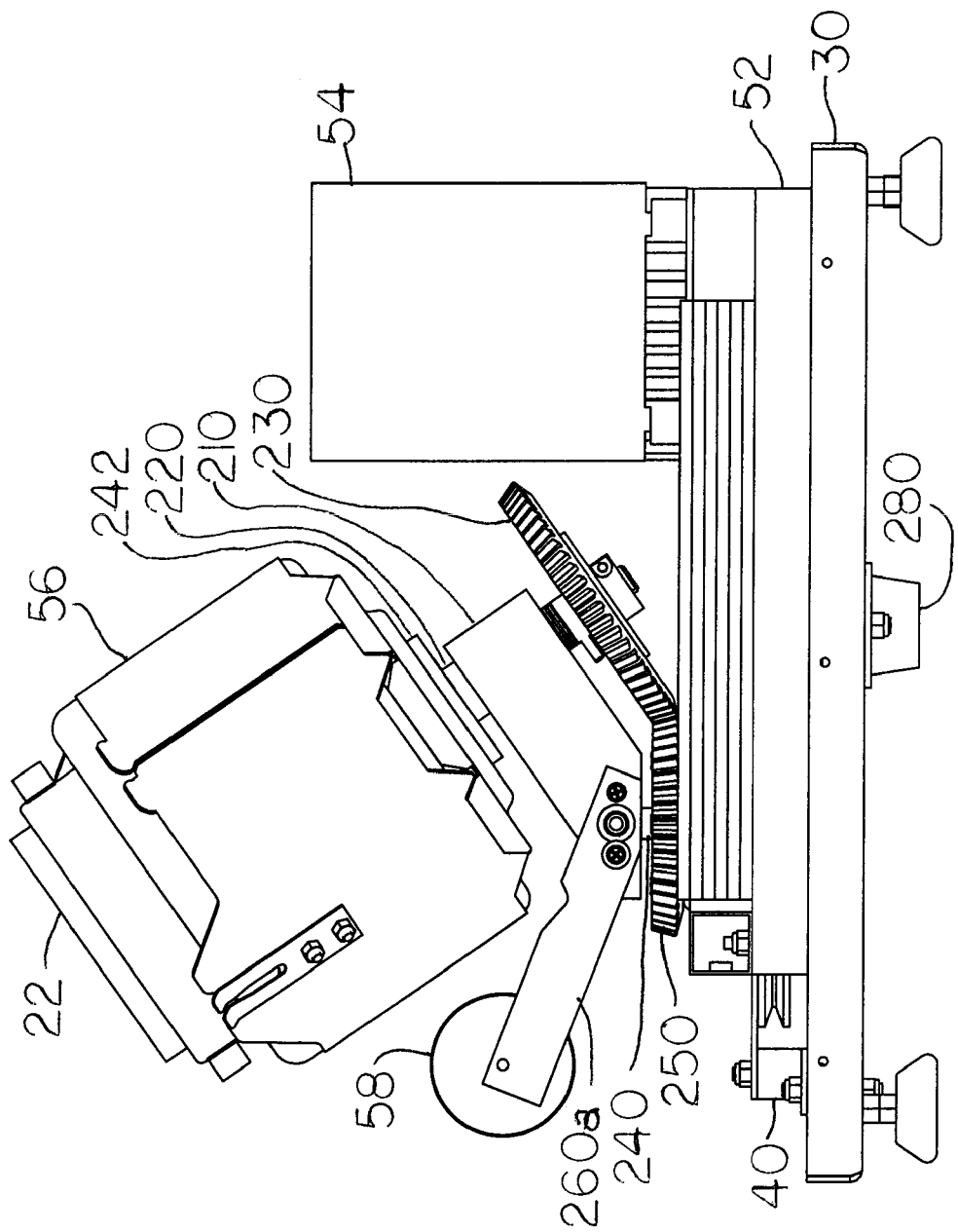
FIG. 2 is a side view of the vortex mixer of FIG. 1.
Figure 3:
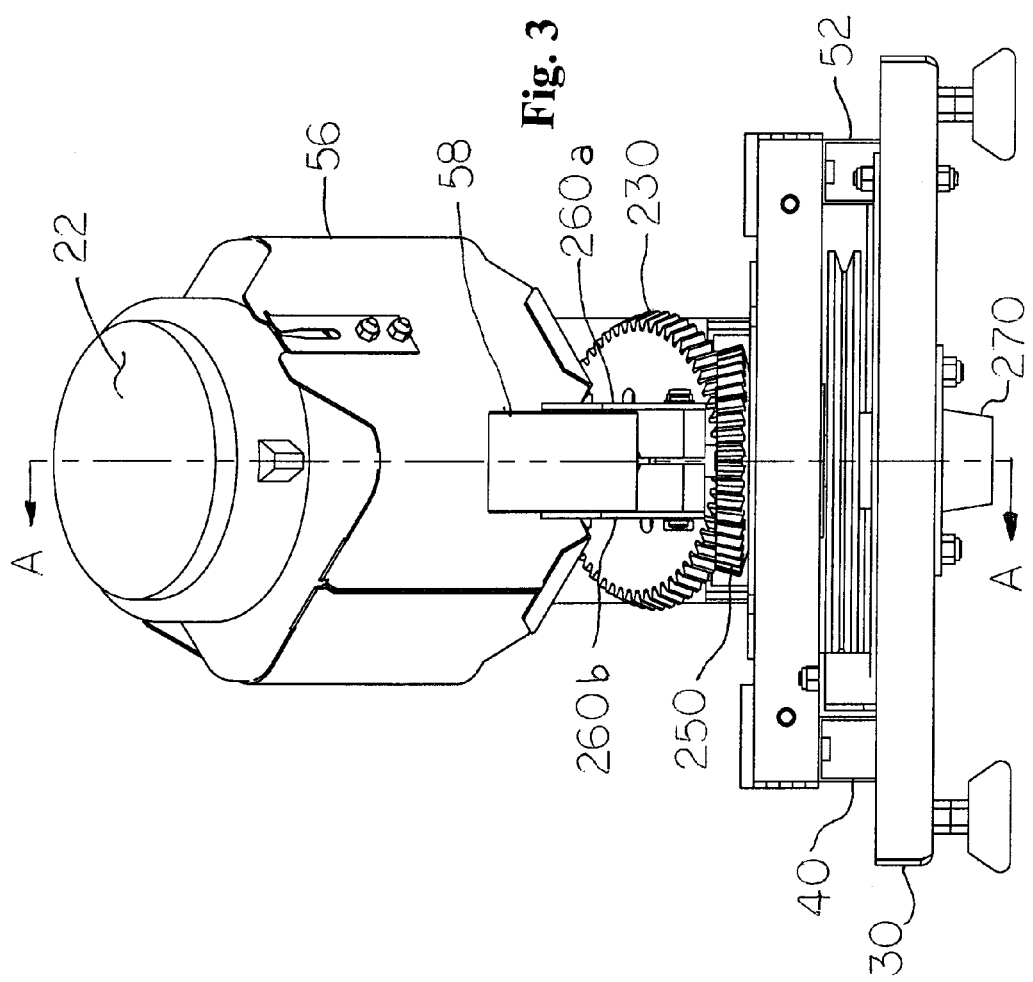
FIG. 3 is a front view of the vortex mixer of FIG. 1.

FIGS. 2 and 3 particularly illustrate additional components of the mixing assembly. Paint container holder 56 is rotationally mounted to an angled mounting arm 210. Angled mounting arm 210 supports shaft 220 and revolving planetary gear 230. Further, angled mounting arm 210 is rotationally mounted to shaft 240 that extends through sun or fixed planetary gear 250. In use, angled mounting arm 210 together with revolving planetary gear 230 are rotated about shaft 240. This rotation causes the planetary gear 230 to rotate or spin paint container holder 56 on shaft 220. FIGS. 2 and 3 also illustrate counterweight 58 that is attached to angled mounting arm 210 by two parallel counterweight arms 260a and 260b. In addition, FIGS. 2 and 3 illustrate pivotal mount 270 that attaches the mixing assembly to the base.

The cross sectional view of FIG. 4, taken along section line A-A in FIG. 3, provides additional detail of an embodiment of a drive mechanism in a vortex mixer including drive pulley 280 attached to motor 54 and driven pulley 290 attached to shaft 240. The cross sectional view of FIG. 4 also illustrates shaft 240 being attached to angled mounting arm 210 and extending through sun gear 250. It is understood that a drive belt, not illustrated, would be used to couple or connect drive pulley 280 and driven pulley 280. The cross sectional view of FIG. 4 also illustrates pivotal mount 270 that attaches the mixing assembly 50 to base 30 so that the motion of the mixing assembly is free to pivot about this attachment point subject to the damping of vibration damping ring 300 and motion limits provided by control arm 40.

The exploded view of FIG. 5 is an embodiment of the invention that illustrates the arrangement of the major assemblies or components of the vortex mixer 20 to each other. Mixing assembly 50 is attached to subframe 52 using conventional fasteners. Subframe 52 may be weighted with added mass or weights, such as the multiple flat plates 60 illustrated in FIG. 1, as needed to enhance the vibrational damping of the mixing assembly or, alternatively, the subframe may be a cast component that is cast to be at a desired, predetermined weight. Subframe 52 rests on the damping ring 300 that is fitted between the subframe 52 and the base 30. The mixing assembly 50 with subframe 52 is also pivotally connected to the base 30 with pivotal mount 270.

Base, Control Arm and Pivot Mount

Figure 6:
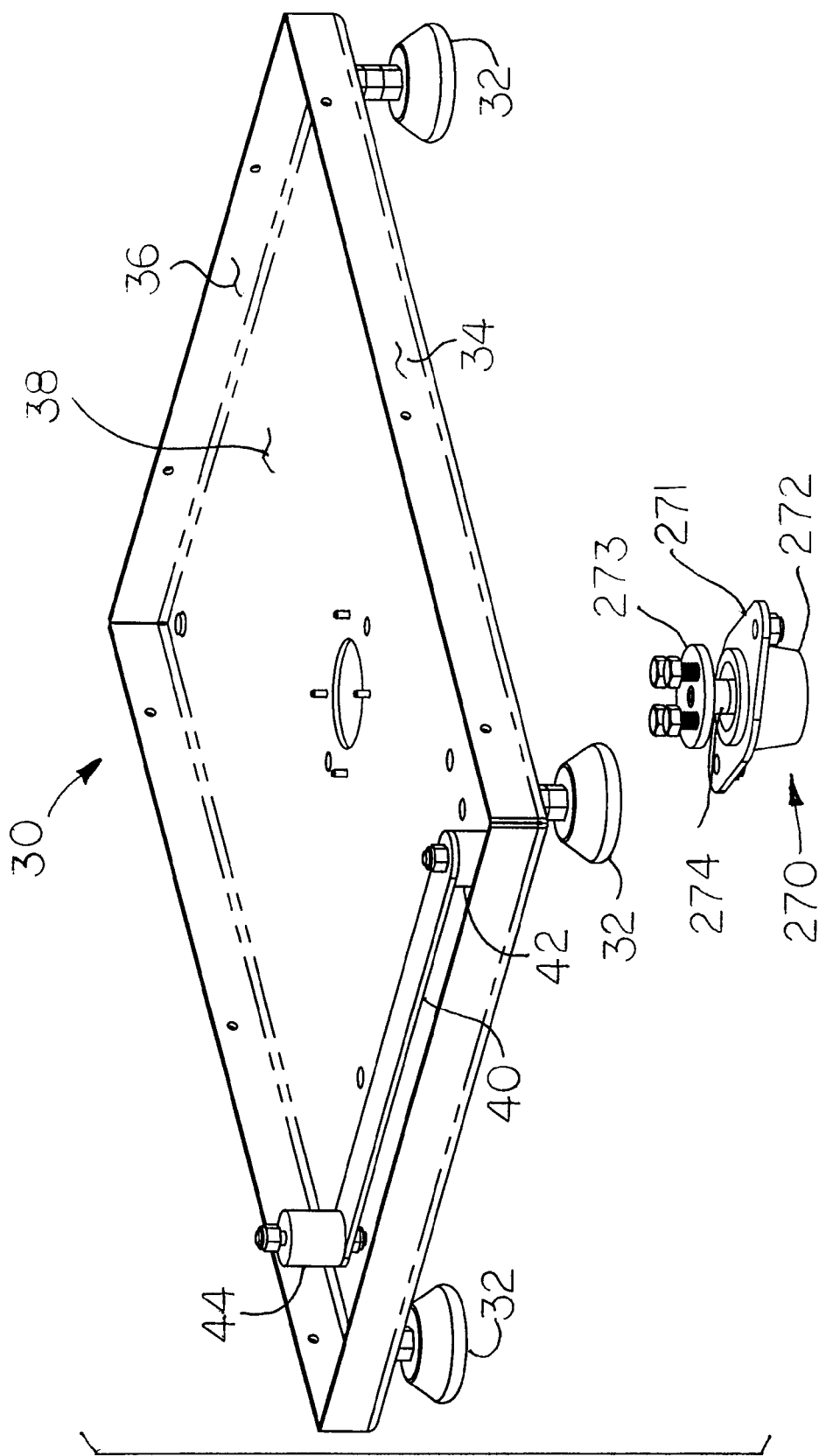
FIG. 6 is an exploded perspective view of an embodiment of a base, control arm and pivot mount of the mixer of FIG. 1.
Figure 7:
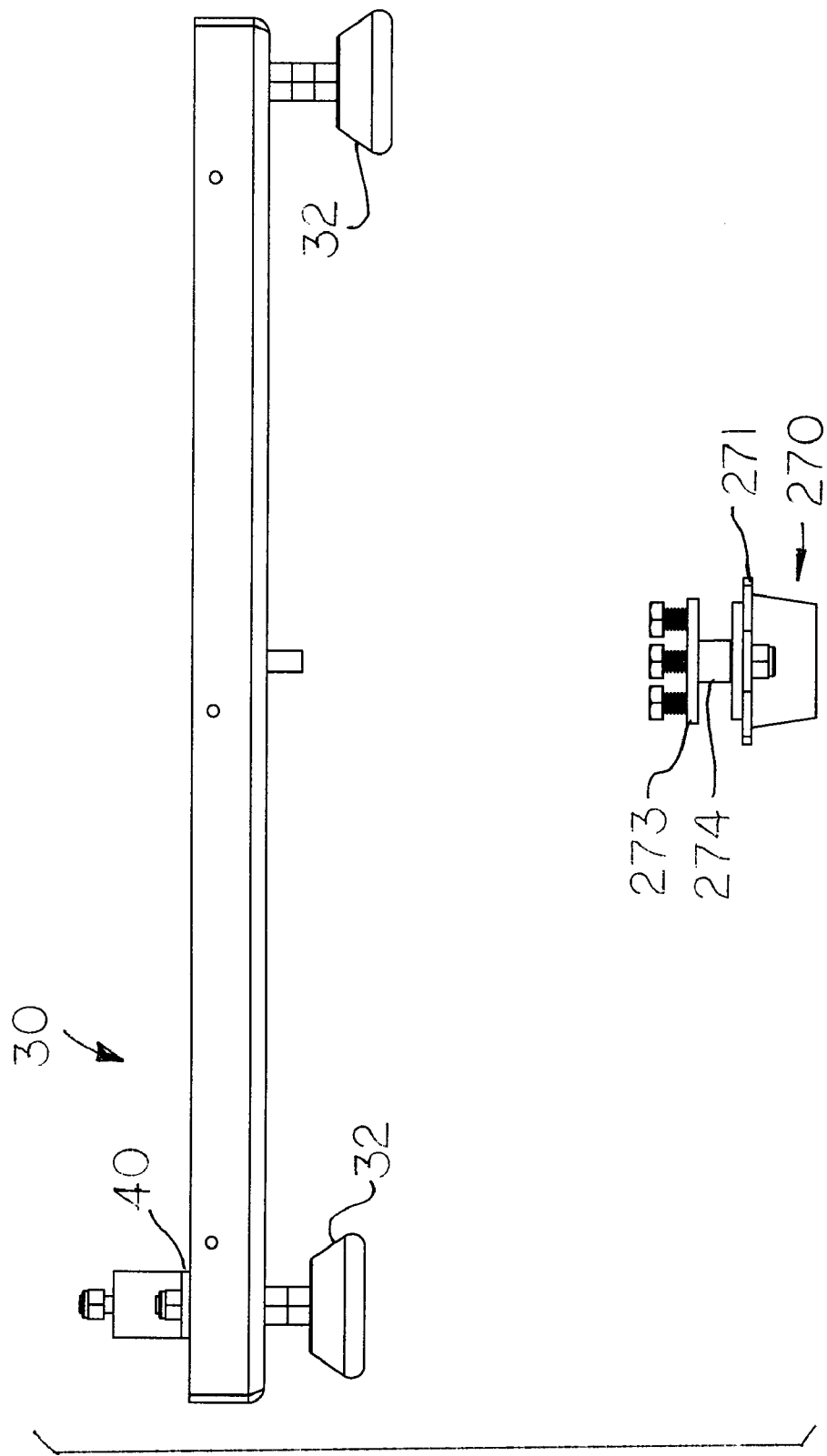
FIG. 7 is a side view of the base of FIG. 6.
Figure 8:
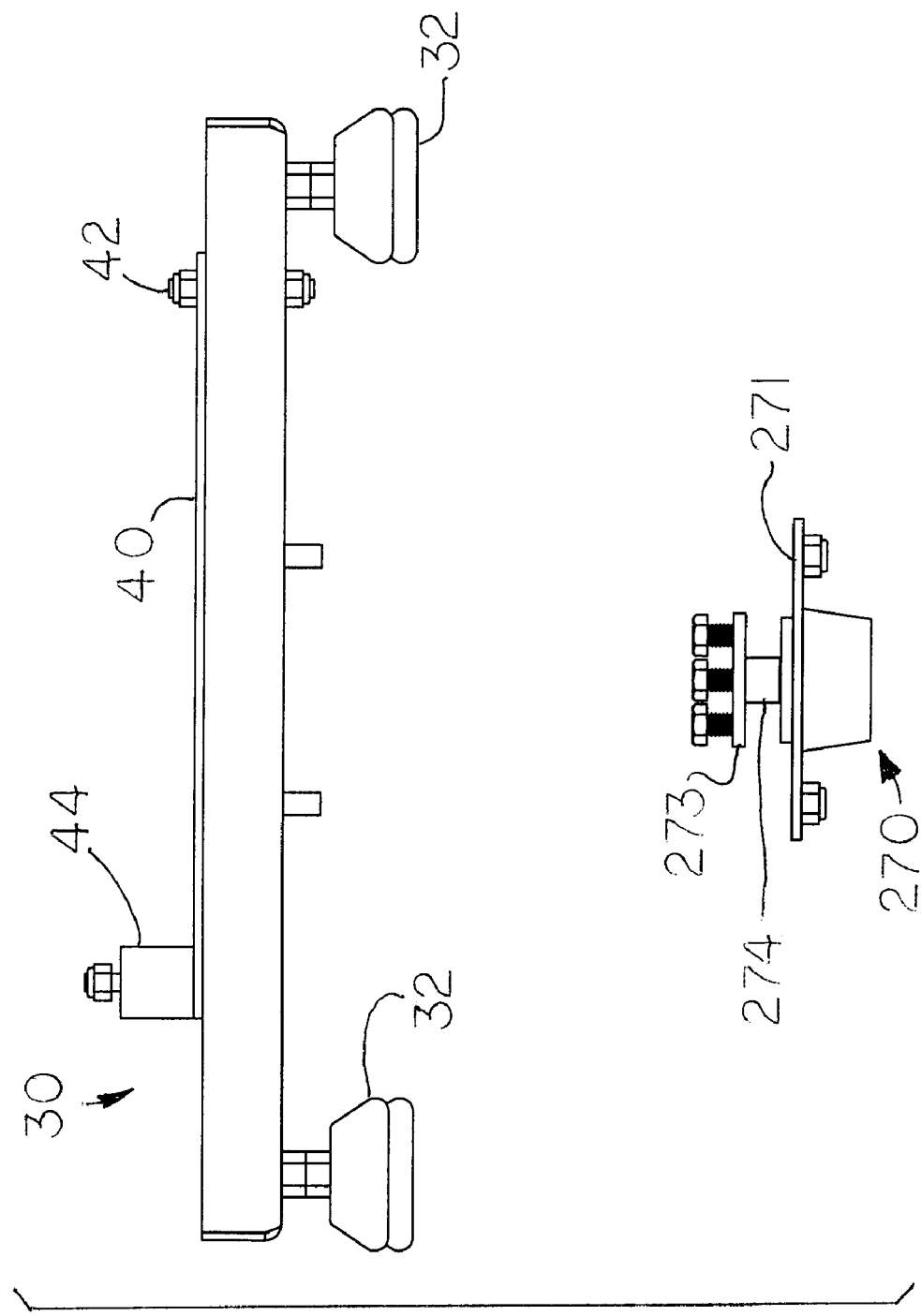
FIG. 8 is a front view of the base, control arm and pivot mount of FIG. 6.

Referring now to FIGS. 6, 7 and 8, a perspective, front and side views of the base 30, control arm 40 and pivotal support 270 are illustrated. Base 30 is formed of sheet metal or other rigid material with edges 34 and 36 formed at 90 degrees and preferably extending up from the upper surface of a planar portion 38 of base 30. In addition, planar portion 38 has apertures for mounting feet 32, and apertures for mounting the pivotal support, vibration damper and control arm. Other configurations of and materials used for the base 30 would be apparent to those skilled in the art. In general, configurations and materials that facilitate mounting of the enclosure or shroud that covers the mixer are suitable.

Control arm 40 is a rigid flat bar that is attached to base 30 with a first resilient bushing or connector 42 and is attached to subframe 52 at frame extension 55 with second resilient bushing or connector 44. The control arm 40 restricts the yaw or twisting motion of the mix assembly during both start up and shut down of the rotation of the paint container holder. The bushings 42 and 44 do not significantly restrict or inhibit other motions of the mixing assembly relative to the base during use, such as side-to-side rocking or front-to-back tipping of the mixing assembly. Although FIGS. 6, 7 and 8 illustrate an embodiment using a least one control arm, alternative embodiments may include one or more control arms that function to restrict the yaw or twisting motion of the mix assembly during both start up and shut down.

Figure 9:
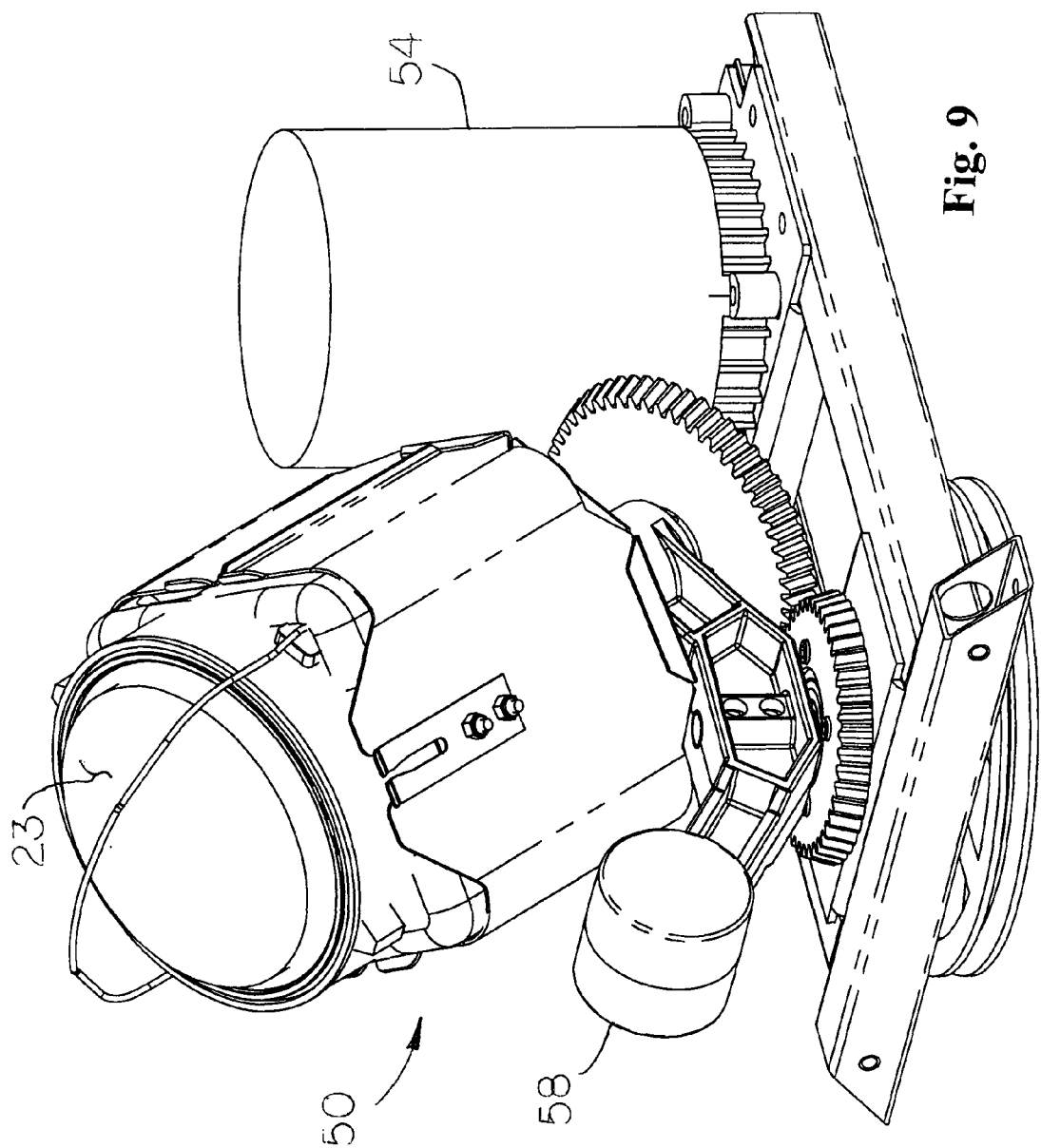
FIG. 9 is a perspective view of an embodiment of a mixing assembly of FIG. 1.

Further, FIGS. 7-9 illustrate one embodiment of a pivotal mount 270. Other variations for the pivoting support would be apparent to the skilled artisan. Referring now to FIGS. 7-9, the pivoting mount 270 attaches or connects the mixing assembly to the base. A first metal mounting structure or flange 271 is located peripherally of an elastomer element 272 with the first metal mounting structure or flange suitable attached, bonded or fixed to the elastomer element. A second metal mounting structure or second flange 273 is located centrally of the elastomer element 272. An insert 274 is received in the second mounting structure or flange 273 and secured to the elastomer using a machine screw 275 that is illustrated in the cross sectional view of FIG. 4. Insert 274 is secured to a the second flange 273 by welding or other conventional fasteners. When assembled, the first flange is mounted to the base and the second flange 273 is mounted to the mixing assembly subframe 52 by four bolts in such a manner that vibration damper 300 is fitted between the adjacent surfaces of the mixing assembly subframe and the base. Alternative bolt configurations and mounting patterns as well as alternative fasteners such as suitable rivets or studs, for example, would be suitable for connecting the mixing assembly subframe and the base.

Mixing Assembly

Figure 10:
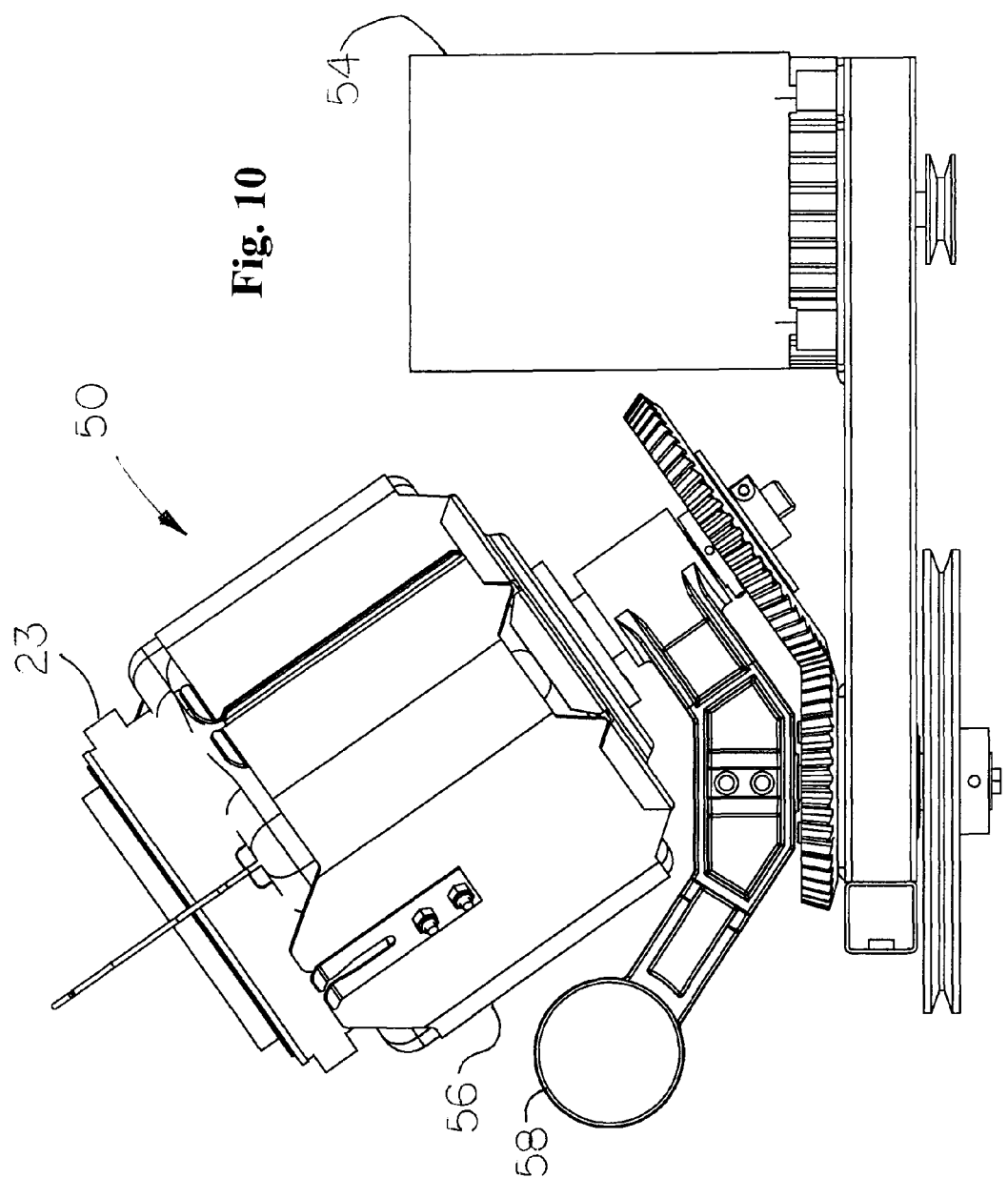
FIG. 10 is a side view of the mixing assembly of FIG. 9.
Figure 11:
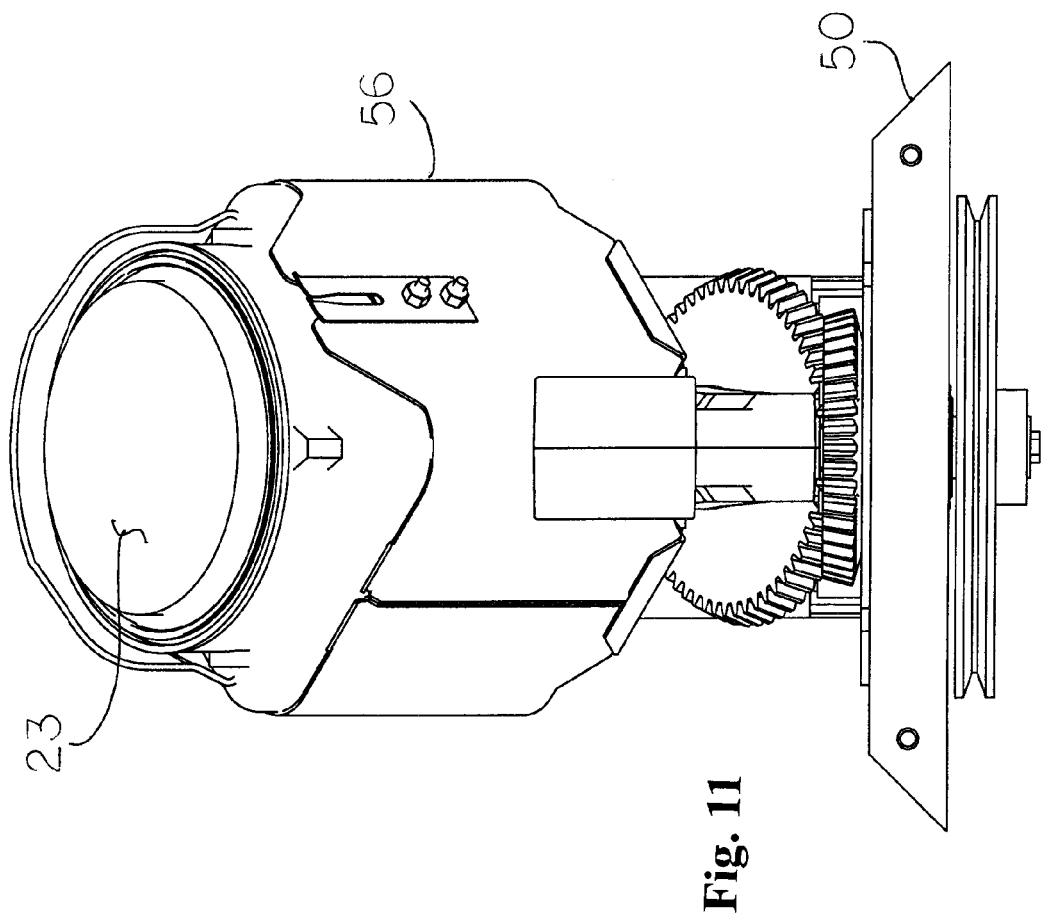
FIG. 11 is a front view of the mixing assembly of FIG. 9.
Figure 12:
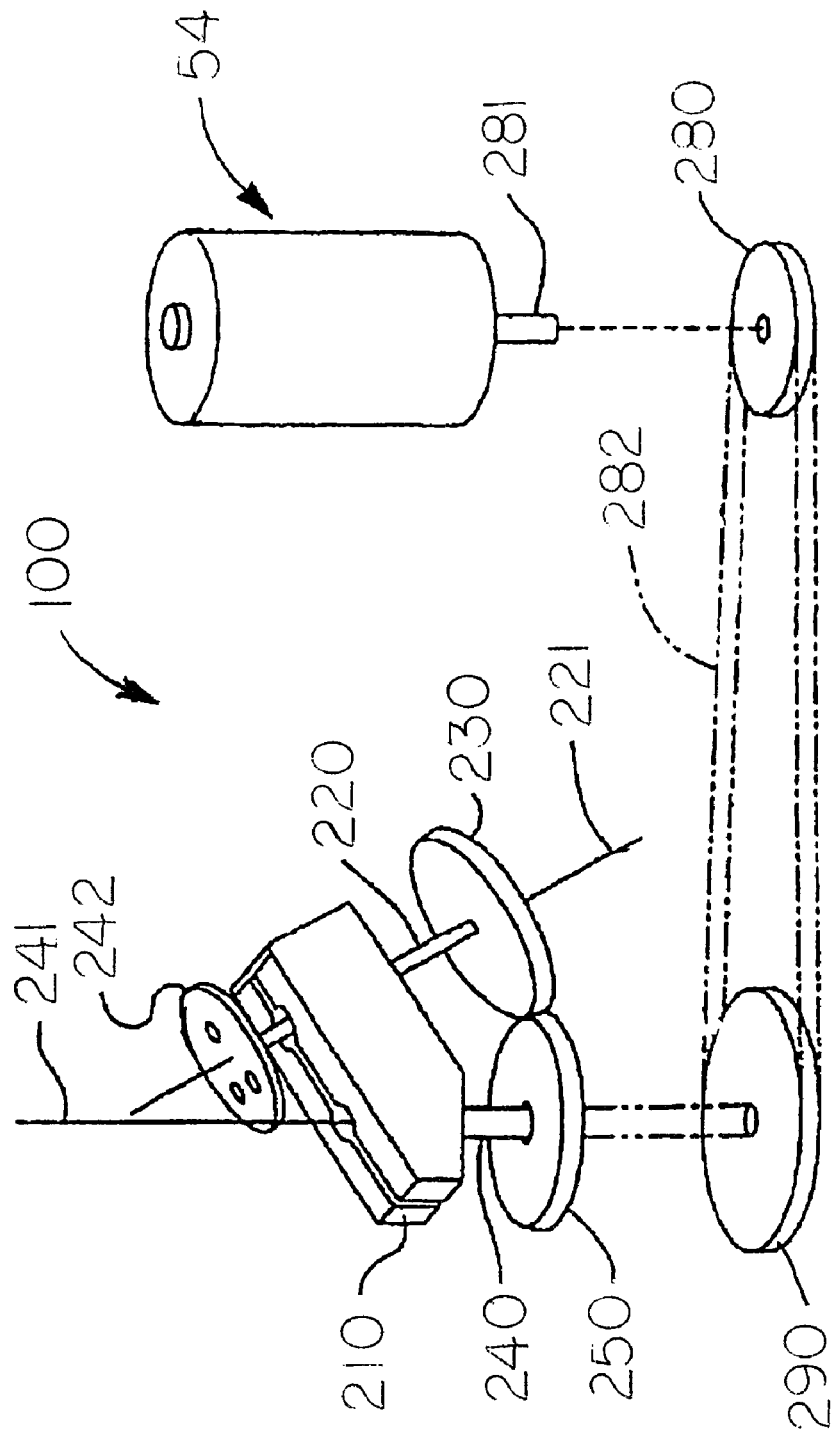
FIG. 12 is a simplified schematic of an embodiment of a drive mechanism in vortex mixer illustrating a first rotational axis and a second rotational axis of the vortex mixer.

FIGS. 9-11 further illustrate an embodiment of a mixing assembly 50 of the present invention. In this illustrated embodiment, a conventional cylindrical paint container is held in the paint container holder.

Drive Mechanism

Mixing assembly 50 supports a driving mechanism 100 for the vortex mixer 20. Referring to the schematic illustration of FIG. 12, driving mechanism 100 includes an electric motor 54 having an output shaft 281, a drive pulley 280, a drive belt 282 (illustrated in phantom), a driven pulley 290 and a driven shaft 240 rigidly connected to an angled mounting arm 210. The drive pulley and driven pulley are connected to their respective shafts using known structures such as set screws and machined key ways or bolts and washers that are fitted to suitably threaded shafts. In addition, driving mechanism 100 includes a planet gear shaft 220 fitted for rotation in angled mounting arm 210, and carrying a planet gear 230 and a paint container holder support 242 for rotation therewith. A sun gear 250 surrounds shaft 240 and is fixed to mixing assembly frame 52 such that sun gear 250 does not rotate, it being understood that shaft 240 is fitted for rotation with respect to sun gear 250. In operation, motor 54 rotates shaft 240 via pulleys 280 and 290 and belt 282, turning angled mounting arm 210 with shaft 240. Because of the interengagement of sun gear 250 and planet gear 230, shaft 220 will spin around on its own axis aligned with an axis of the paint container along reference line 221 while at the same time revolving or orbiting around shaft 240 with an axis of rotation along reference line 241.

Paint Container Holder or Receptacle

Figure 13:
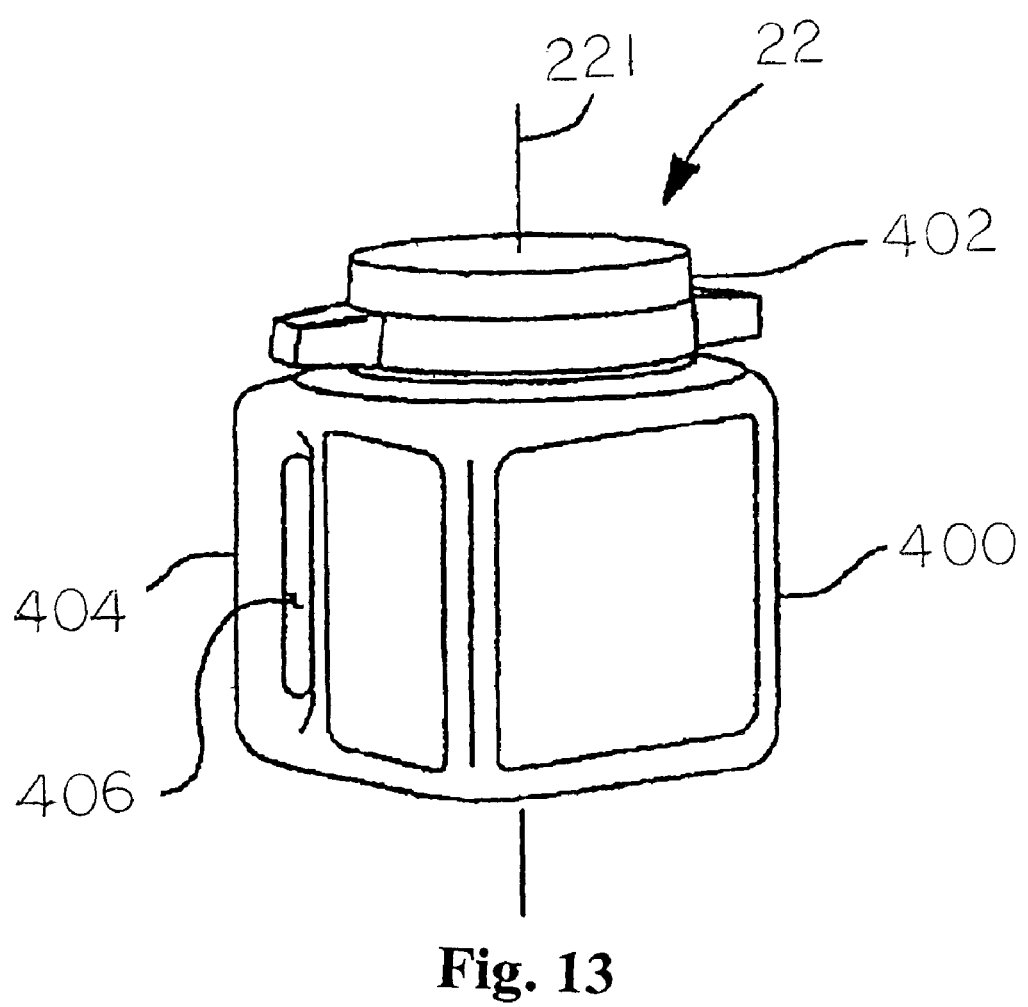
FIG. 13 is a perspective view of a square paint container.

A paint container 22 with a polygonal shape, generally a square or rectangular body, 400, with a threaded lid 402 is illustrated in FIG. 13. One corner of square container 22 has a handle 404 integrally formed therein forming an aperture or void 406. Because of handle 404 and aperture 406, container 22 does not have a symmetrically distributed inertia with respect to the central axis 221 of container 22. Because of this eccentric inertial load, when container 22 (full of paint) is mixed using vortex mixer 20, an unbalanced load will occur, which, if not dampened or unchecked, will cause severe motion or vibration that may be sufficient to cause the vortex mixer 20 to "walk" or move laterally on the surface on which it rests.

Figure 14:
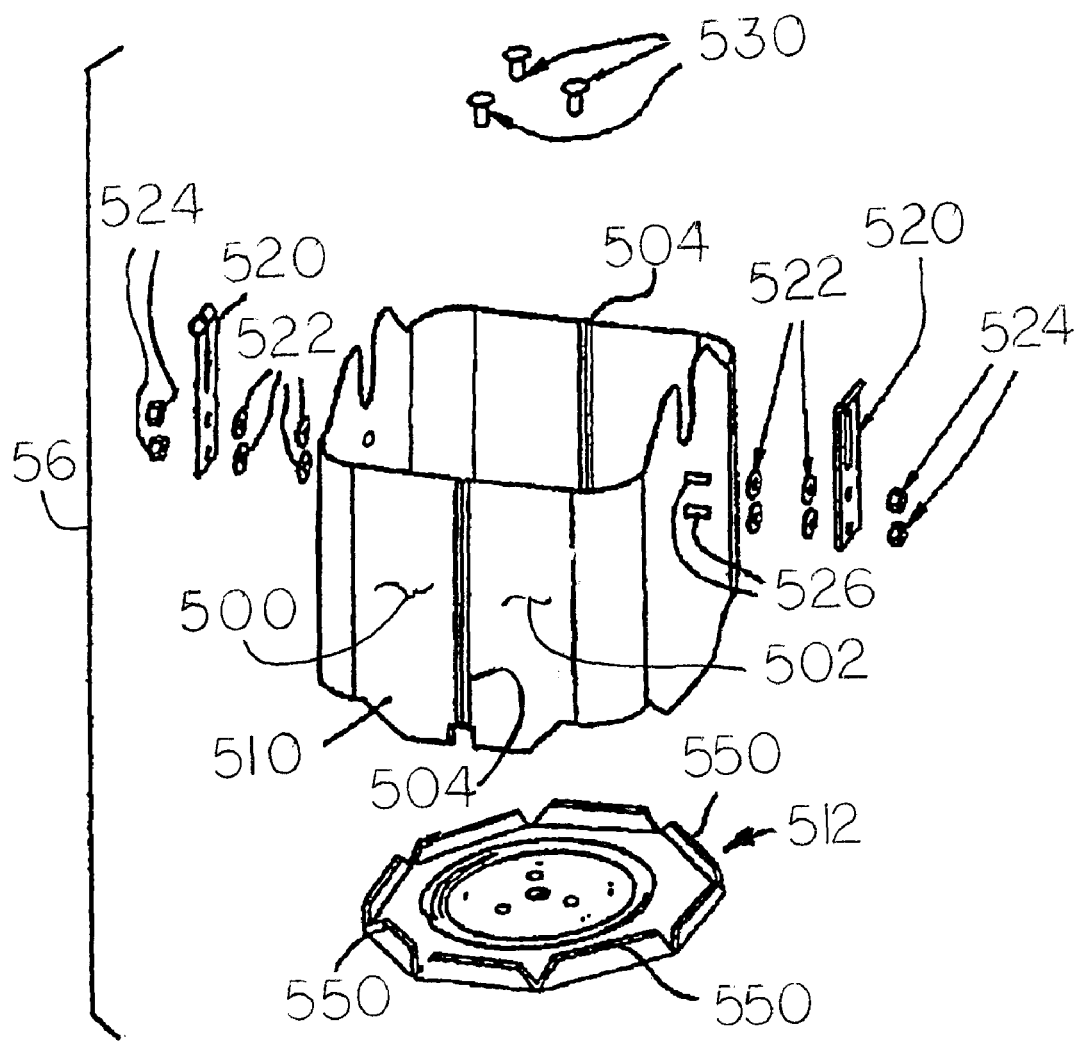
FIG. 14 is an exploded view of an embodiment of a paint container holder.
Figure 15:
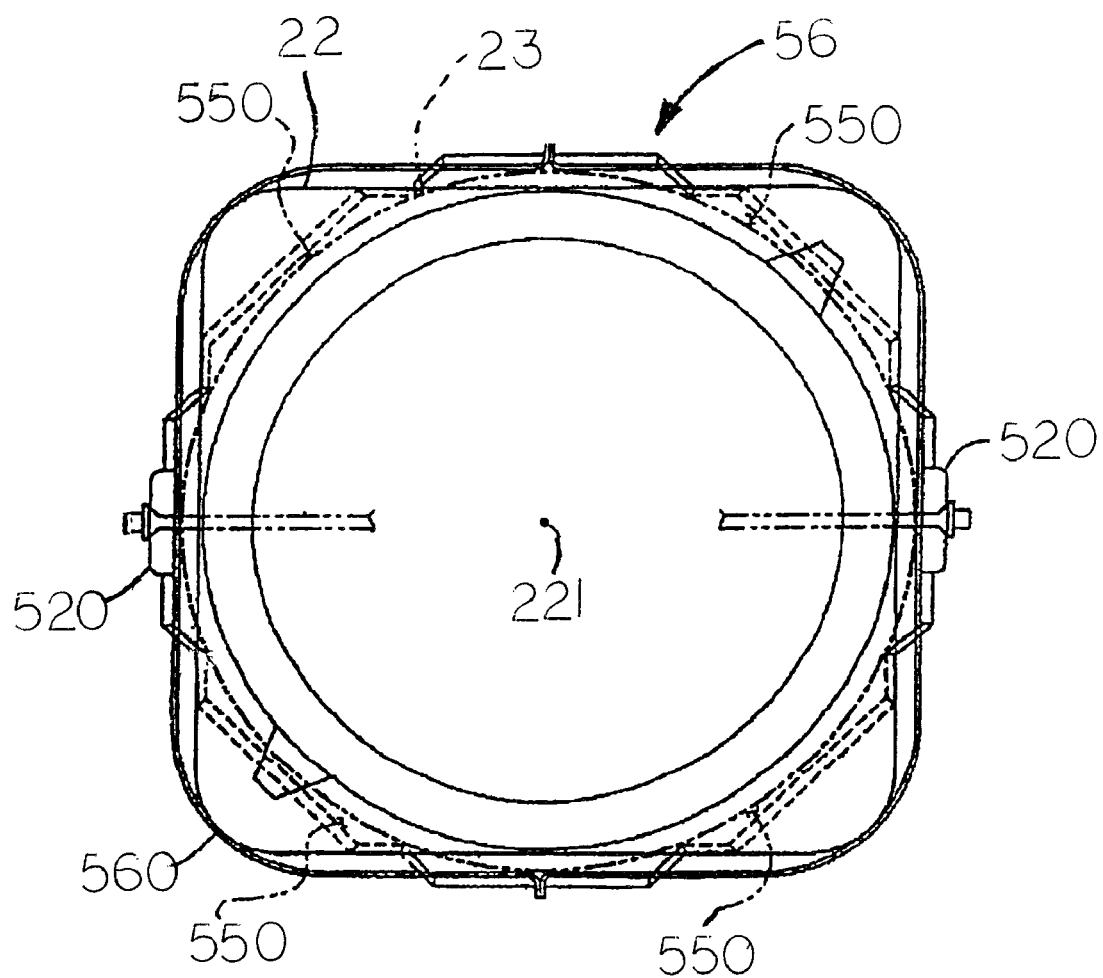
FIG. 15 is a top view of the paint container holder of FIG. 14.

FIGS. 14 and 15 illustrate details of an embodiment of a paint container holder subassembly 56. In this embodiment, holder subassembly 56 has a pair of sheet metal sides 500 and 502 that are welded together along seams 504 to form a unitary assembly 510. The sides of the container holder may be appropriately stiffened using ribs formed in the sheet metal or other stiffening structures that are not illustrated in FIGS. 14 and 15. A lower plate 512 is also welded to the assembly 510. A pair of spring tabs 520 are secured to unitary assembly 510 using washers 522 and locknuts 524 received on threaded bosses 526. Spring tabs 520 receive the wire bail when a cylindrical paint container is placed in holder 56, to prevent the paint container from slipping within the holder when it spins about axis 221. In some embodiments, a thin elastomeric or rubber pad is adhered to an outer surface of the spring tabs in order to dampen vibration and reduce the noise associated with the operation of the mixer. Holder subassembly 56 is secured to the paint container holder support 225 (illustrated in FIGS. 2 and 4) using screws 530. In FIG. 15, the rectangular or square paint container 22 is shown in solid lines, and a cylindrical paint container 23 is shown in chain lines. The wire bail 25 of the cylindrical paint container 23 is held by clips 520 to locate the top of paint container 23. Four upturned edges 550 formed in lower plate 512 locate the bottom of paint container 23. When the cylindrical paint container is located by clips 512 and edges 550, the paint container will be positioned in holder 56 so that the center of gravity or center of mass of the cylindrical container 23 is at axis 221. Axis 221 is coincident with a center of geometry for the rectangular paint container 22. However, it is to be understood that a center of gravity for the non-cylindrical paint container 22 is not located at axis 221. The offset between the center of gravity and center of geometry of container 22 arises because of the void 406 created by handle 404 in container 22. Container 22 rests on top of edges 550, and is positioned within holder 56 by contact between the holder 56 and container 22 at their respective corners, to maintain alignment of container 22 in holder 56. The handle 404 of container 22 may be placed in any of the corners of holder 550 (for example, corner 560), and the vibration damping systems of the present invention will compensate for the eccentric load occasioned by container 22.

Vibration Damper

The present invention overcomes excessive vibration and base movement or "walking" by reducing the amount of vibration transmitted from the paint container 22 back through driving mechanism 100 to the base 30 and exterior of vortex mixer 20. This result is accomplished because vortex mixer 20 has a vibration damper 300 preferably in the form of an annular member or ring made from commercially available viscoelastic polymeric material. In the practice of the present invention, it has been found desirable to use a ring having about a 60 durometer (shore about 00) material but it is to be understood that other geometries and durometers for vibration damper 300 may be used in the practice of the present invention. Furthermore, various shapes for one or more dampers or damper elements may be used. A ring having dimensions of about one inch thickness, about 5 inches OD, and about 3.1 inches ID has been found to be suitable in selected embodiments of the invention. Those skilled in the art will recognize that other structures or materials such as suitable springs or hydraulic components would provide vibration reduction similar to that provided by the viscoelastic polymeric material described above.

In all embodiments or alternatives, the vibration damper is located between a mixing frame assembly 50 and a base 30 of the vortex mixer 20. The vibration damper 300 acts as an energy absorber when the mixing frame assembly 50 pivots with respect to the base 30 and deforms the damper. The vibration damper element or elements may be arranged anywhere between the mixing frame assembly and the base, while still remaining within the scope of the present invention. Preferably, the mixing assembly subframe assembly 52 has a generally planar support surface and the base 30 also has a generally planar surface, so that the vibration damper is suitable located between the generally planar support surface of the mixing assembly subframe 52 and the base 30.

In some embodiments, vibration damper 300 extends substantially completely around the pivot mount 270. In alternative embodiments the vibration damper may extend only partially around the pivot mount. A further embodiment of the present invention is to have at least one and preferably a plurality of vibration damper elements located at one or more predetermined distances (or, equivalently, at a predetermined effective radius) from the pivot mount.

It has also been found suitable to provide a predetermined preload for the vibration damper, to obtain more effective or efficient use of the viscoelastic material forming the vibration damper. It is also to be recognized that the viscoelastic material of the vibration damper will act as a spring in addition to acting as an energy absorber, and the spring effect of viscoelastic material must be taken into account in the design and construction of the rotation system of the present invention. In one embodiment of the present invention with a mixing frame assembly having a weight of approximately 70 pounds (without a paint container), a total preload on the vibration damper to deform the damper about $1/16$ to $1/8$ inch has been found desirable, resulting in sufficient deformation (which may be, but need not be, in the form of compression) of the vibration damper to achieve the desired spring action. It is to be understood to be within the scope of the present invention to have alternative deformation of the vibration damper (other than compression), such as tension or shear or a combination thereof depending on the particular mechanical characteristics of a suitable vibration damper. However, in a preferred embodiment, the preload is achieved by applying a compressive load across the pivoting mount 270. In another aspect, the predetermined preload may be chosen (additionally or alternatively) to be an amount sufficient to provide a sufficient degree of leveling for the mixing frame assembly when it is at rest.

Vibration Control

Another aspect of the present invention improves machine isolation by decreasing machine resonance frequencies in the 3 rotational degrees of freedom (DOF) (rotation around three mutually orthogonal x, y, and z axes). The resonance frequency or frequencies are decreased to a point substantially less than the driving frequencies which correspond to the rotational velocities of the spin and orbit motions. It has been found that reducing the resonance frequency to be less than or equal to $1/\sqrt{2}$ times the lowest driving frequency or approximately 0.7 times the lowest driving frequency is desirable.

In connection with the present invention, it has been determined that it is desirable to isolate the rotational DOF, while the translational DOF can be ignored (or positively restrained). Using a pivotal mount or support to allow rotational movement between a base of the machine and a mixing frame assembly carrying the rotating and revolving paint container holder, but restricting translation between the mixing frame assembly and the base, allows sufficient stability when loading paint containers into the vortex mixer's paint container holder.

To reduce unwanted motion of vortex mixer 20, it is desirable to increase isolation of intermittent loads from the base 30. Factors that affect vibration transmission include: the natural frequency of the system, the magnitude of the forcing frequency, and the rate of the forcing frequency. The natural frequency of the system is determined by the mass of the system, and the spring rate of the vibration damper. The magnitude of the forcing frequency is a function of the mass of the filled paint container and the speed at which it spins about axis 221 and the speed at which it orbits axis 241. The rate of the forcing frequency is equal to the lower of the spin and orbit speeds. The vortex mixer 20 suited for the practice of the present invention has an orbit speed which is lower than the spin speed. Common practice to achieve 80% vibration isolation is to keep the frequency ratio equal to or greater than 2.5. The frequency ratio (FR) equals the forcing frequency ($f_f$) divided by the natural frequency of the system ($f_n$).

$$FR = f_f/f_n \quad (1)$$

In the present invention, it is desirable to use the spin and orbit speeds that have been effective for mixing paint in cylindrical containers. Hence the forcing frequency (in Hertz) will be where the speed in RPM is divided by 60 to convert from minutes to seconds.

$$f_f = RPM/60 \quad (2)$$

To get 80% isolation (20% transmissibility, T), the natural frequency will need to be:

$$f_n = f_f/[1/(1/T+1)]^{1/2} \text{ or } f_n = f_f/2.45 \text{ for } T=20\% \quad (3)$$

This gives a desired natural frequency based on the orbit speed of the vortex mixer 20. In order to reduce the natural frequency of the system, either the mass of the system must be increased or the spring rate of the vibration damper must be reduced, or both. The desired static deflection in inches is given by:

$$d_s = 9.8/(f_n)^2 \quad (4)$$

The spring rate for the system is given by:

$$K_{sys} = W/d_s \quad (5)$$

where W is the weight in pounds and d.sub.s is the system deflection in inches.

Method Using the Vortex Mixer

Another embodiment of the invention is a method of damping vibration and movement in a paint mixing machine for mixing paint in cylindrical or non-cylindrical paint containers. In one embodiment, the method comprising the steps of: a) providing a receptacle for receiving one of a cylindrical or a non-cylindrical paint container on a mixing assembly; b) pivotally mount the mixing assembly on a base; c) providing one or more viscoelastic vibration dampers between the mixing assembly and the base; d) connecting the mixing assembly and the base with a control arm; e) rotating a paint container in the receptacle in a spinning motion about an axis of the receptacle and in an orbiting motion about an axis separate from the axis of the receptacle; and f) damping vibration between the mixing assembly and the base such that vibration in the base caused by the rotating paint container is reduced by the viscoelastic vibration damper.

This invention is not to be taken as limited to all of the details thereof as modifications and variations thereof may be made without departing from the spirit or scope of the invention.

What is claimed is:

1. A vortex motion paint mixing machine having a paint container holder spinning about its own axis and orbiting about a second axis positioned at an angle to the container spin axis, the vortex motion paint mixing machine comprising:
   a base;
   a paint mixing assembly pivotally connected to the base with a pivotal mount, the paint mixing assembly including a subframe;
   a control arm having a first end attached directly to the base via a first resilient connector and a second end attached directly to the subframe via a second resilient connector having a fixed length, the control arm disposed parallel to the base; and
   one or more viscoelastic polymer vibration dampers disposed between the paint mixing assembly and the base;
   wherein the control arm restricts yaw or twisting motion of the paint mixing assembly during start up and shut down.

2. The paint mixing machine of claim 1 wherein the vibration dampers extend at least partially circumferentially around a pivotal connection.

3. The paint mixing machine of claim 1 wherein the vibration dampers extend substantially completely around the pivotal mount.

4. The paint mixing machine of claim 1 wherein the vibration dampers are a ring surrounding the pivotal mount.

5. The paint mixing machine of claim 1 wherein the vibration dampers comprise at least one viscoelastic material.

6. The paint mixing machine of claim 1 wherein the vibration dampers comprise different viscoelastic materials.

7. The paint mixing machine of claim 1 wherein the paint mixing assembly further comprises a paint container holder and a drive mechanism to spin and orbit a paint container.

8. The paint mixing machine of claim 1 wherein the paint container holder has a non-cylindrical paint container receiving aperture.

9. The paint mixing machine of claim 1 wherein the paint container holder has a generally polygonal paint container receiving aperture.

10. The paint mixing machine of claim 1 wherein the paint container holder has a rectangular or square container receiving aperture.

11. The paint mixing machine of claim 8 wherein the paint container holder comprises a pair of spring clips where a portion of the clips are covered with an elastomeric or rubber pad.

12. The paint mixing machine of claims 1 wherein the paint mixing assembly further comprises a predetermined added mass to alter a natural frequency of the paint mixing assembly and dampen the vibration of the paint mixing machine.

13. The paint mixing machine of claim 1 wherein the control arm comprises a rigid flat bar.

\* \* \* \* \*